United States Patent
Jiang et al.

(10) Patent No.: US 12,052,758 B2
(45) Date of Patent: Jul. 30, 2024

(54) DATA TRANSMISSION METHOD AND APPARATUS AND COMMUNICATION SYSTEM

(71) Applicant: FUJITSU LIMITED, Kawasaki (JP)

(72) Inventors: Qinyan Jiang, Beijing (CN); Xin Wang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 270 days.

(21) Appl. No.: 17/363,455

(22) Filed: Jun. 30, 2021

(65) Prior Publication Data

US 2021/0378013 A1    Dec. 2, 2021

Related U.S. Application Data

(63) Continuation of application No. PCT/CN2019/071052, filed on Jan. 9, 2019.

(51) Int. Cl.
*H04W 74/0816* (2024.01)
*H04W 74/08* (2009.01)
(Continued)

(52) U.S. Cl.
CPC ... *H04W 74/0816* (2013.01); *H04W 74/0825* (2013.01); *H04W 74/0866* (2013.01); *H04L 27/26025* (2021.01)

(58) Field of Classification Search
CPC .................. H04W 74/0816; H04W 74/0825
See application file for complete search history.

(56) References Cited

U.S. PATENT DOCUMENTS

2008/0219235 A1*  9/2008  Ma .................. H04L 5/0051
                                                    370/344
2016/0100372 A1    4/2016  Dinan
(Continued)

FOREIGN PATENT DOCUMENTS

CN    107079494 A     8/2017
WO    2017/214621 A1  12/2017
WO    2018/143856 A1  8/2018

OTHER PUBLICATIONS

Notice of Reasons for Refusal issued by the Japan Patent Office for corresponding Japanese Patent Application No. 2021-539608, mailed on Jul. 19, 2022, with an English translation.
(Continued)

*Primary Examiner* — James P Duffy
(74) *Attorney, Agent, or Firm* — Myers Wolin, LLC

(57) ABSTRACT

A data transmission method, apparatus and system including terminal equipment for channel detection and terminating the channel detection at a first time position, a result of the channel detection being that a channel is idle; and the terminal equipment transmits data starting from a second time position, the second time position being after the first time position, a first time length between the first time position and the second time position being less than or equal to a second time length. The terminal equipment terminates the channel detection after determining that the channel is idle, and transmits data after a time length (a first time length). As the first time length is less than or equal to a time length (the second time length) of an OFF-ON transient period to which the data correspond, a time length between terminating the channel detection and transmitting the data is reduced.

14 Claims, 7 Drawing Sheets

(51) Int. Cl.
*H04W 74/0808* (2024.01)
*H04L 27/26* (2006.01)

(56) References Cited

U.S. PATENT DOCUMENTS

| | | | | |
|---|---|---|---|---|
| 2017/0135128 | A1* | 5/2017 | Yerramalli | H04W 74/006 |
| 2017/0318607 | A1 | 11/2017 | Tiirola et al. | |
| 2019/0132875 | A1* | 5/2019 | Ljung | H04W 74/0816 |
| 2019/0230707 | A1* | 7/2019 | Bergljung | H04L 5/0073 |

OTHER PUBLICATIONS

LG Electronics, "Consideration on SRS and following PUSCH", Agenda Item: 7.2.1.2, 3GPP TSG-RAN WG1 Meeting #86, R1-166816, Gothenburg, Sweden, Aug. 22-26, 2016.

The extended European search report with the supplementary European search report and the European search opinion issued by the European Patent Office for corresponding European Patent Application No. 19909386.5-1215, mailed on May 2, 2022.

International Search Report and Written Opinion of the International Searching Authority issued by the China National Intellectual Property Administration for corresponding International Patent Application No. PCT/CN2019/071052, mailed on Oct. 8, 2019, with an English translation.

Samsung, "CCA slot and tx-rx/rx-tx switching time", Agenda Item: 7.1.7, 3GPP TSG-RAN WG1 Meeting #86bis, R1-1608982, Lisbon, Portugal, Oct. 10-14, 2016.

Huawei et al., "Further details of LAA downlink subframe timing", Agenda Item: 7.2.3.3, 3GPP TSG-RAN WG1 Meeting #82bis, R1-155645, Malmo, Sweden, Oct. 5-9, 2015.

Samsung, "Remaining issues of SRS transmission followed by PUSCH", Agenda Item: 7.2.1.2, 3GPP TSG-RAN WG1 Meeting #86, R1-166687, Gothenburg, Sweden, Aug. 22-26, 2016.

Communication pursuant to Rule 164(1) EPC with the partial supplementary European search report, issued by the European Patent Office for corresponding European Patent Application No. 19909386.5-1215, mailed on Dec. 22, 2021.

First Notification of Office Action and Search Report issued by the China National Intellectual Property Administration for corresponding Chinese Patent Application No. 201980086092.0, dated May 26, 2023, with an English translation.

* cited by examiner

DATA TRANSMISSION METHOD AND APPARATUS AND COMMUNICATION SYSTEM

CROSS-REFERENCE TO RELATED APPLICATION

This application is a continuation application of International Application PCT/CN2019/071052 filed on Jan. 9, 2019 and designated the U.S., the entire contents of which are incorporated herein by reference.

FIELD

This disclosure relates to the field of communications, and in particular to a data transmission method and apparatus and a communication system.

BACKGROUND

In an unlicensed band or a sharing band, in order to share spectral resources fairly and efficiently, a device needs to occupy a channel to transmit data by employing a channel access method or process when a condition is satisfied.

According to the regulatory requirements for existing European 5 GHz unlicensed band, taking a load based equipment (LBE) as an example, this equipment detects whether there exists another equipment performing transmission on a channel by using a channel access mechanism based on Listen Before Talk (LBT), and the equipment may occupy the channel to transmit data if there exists no other equipment performing transmission on the channel. The above equipment may be an initiating device, or a responding device, or both. Reference may be made to the regulatory requirements for existing European 5 GHz unlicensed band for definitions of initiating device and responding device.

The Initiating Device can authorize the Responding Device to send data on the channel after accessing a certain channel, and share the access channel with the Responding Device within the corresponding channel occupancy times (COT, channel occupancy times). Among them, COT is the sum of time of all transmissions in a channel occupancy (CO, channel occupancy) and all gaps (gap) less than or equal to 25 us, and cannot exceed the maximum COT corresponding to the CO (such as 2 ms, 5 ms, 10 ms, etc.) A CO or COT may include one or more transmissions of the Initiating Device, may also include one or more transmissions of one or more Responding Device(s), or may not include the transmission of the Responding Device. For the CO or COT, the time duration from the beginning of the first transmission to the end of the last transmission cannot exceed 20 ms.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in the License Assisted Access (LAA) of Long Term Evolution (LTE), for a terminal equipment, according to its power change process (ON/OFF time mask), a starting position of an OFF-ON transient period is identical to a starting position of a time domain resource to which corresponding data corresponds. However, in New Radio (NR) Release 15 (Rel-15), according to its power change process, the starting position of the OFF-ON transient period is different from the starting position of the time domain resource to which the corresponding data corresponds. If this power change process is applied to an unlicensed band or a sharing band, it means that an NR-based device may possibly need to occupy the channel before transmitting data. Therefore, in order to share resources of the unlicensed band or sharing band fairly and efficiently, it needs to consider influence of the power change process on channel access.

Address to at least one of the above problems or similar problems, embodiments of this disclosure provide a data transmission method and apparatus and a communication system.

According to a first aspect of the embodiments of this disclosure, there is provided a data transmission method, applicable to a terminal equipment, the method including:

a terminal equipment performs channel detection;

the terminal equipment terminates the channel detection at a first time position, a result of the channel detection being that a channel is idle; and the terminal equipment transmits data starting from a second time position, the second time position being after the first time position, a first time length between the first time position and the second time position being less than or equal to a second time length, the second time length being equal to a time length of an OFF-ON transient period to which the data correspond.

According to a second aspect of the embodiments of this disclosure, there is provided a data transmission method, applicable to a terminal equipment, the method including:

a terminal equipment receives first indication information and second indication information transmitted by a network device, the first indication information indicating a third time position, and the second indication information indicating a channel access type; and the terminal equipment transmits data starting from a second time position according to the third time position and the channel access type, the third time position being before the second time position, or the third time position being identical to the second time position.

According to a third aspect of the embodiments of this disclosure, there is provided a data transmission method, applicable to a network device, the method including:

the network device generates first indication information and second indication information; and the network device transmits the first indication information and second indication information to a terminal equipment;

wherein the first indication information indicates a third time position, and the second indication information indicates a channel access type, the third time position and channel access type being used for transmitting data starting from a second time position by the terminal equipment, and the third time position being before the second time position, or the third time position being identical to the second time position.

According to a fourth aspect of the embodiments of this disclosure, there is provided a data transmission apparatus, configured in a terminal equipment, the apparatus including:

a detecting unit configured to perform channel detection, and terminate the channel detection at a first time position, a result of the channel detection being that a channel is idle; and a transmitting unit configured to transmit data starting from a second time position, the second time position being after the first time position, a first time length between the first time position and the second time position being less than or equal to a second time length, the second time length being equal to a time length of an OFF-ON transient period to which the data correspond.

According to a fifth aspect of the embodiments of this disclosure, there is provided a data transmission apparatus, configured in a terminal equipment, the apparatus including:

a first receiving unit configured to receive first indication information and second indication information transmitted by a network device, the first indication information indicating a third time position, and the second indication information indicating a channel access type; and a transmitting unit configured to transmit data starting from a second time position according to the third time position and the channel access type, the third time position being before the second time position, or the third time position being identical to the second time position.

According to a sixth aspect of the embodiments of this disclosure, there is provided a data transmission apparatus, configured in a network device, the apparatus including:

a generating unit configured to generate first indication information and second indication information; and a transmitting unit configured to transmit the first indication information and second indication information to a terminal equipment;

wherein the first indication information indicates a third time position, and the second indication information indicates a channel access type, the third time position and channel access type being used for transmitting data starting from a second time position by the terminal equipment, and the third time position being before the second time position, or the third time position being identical to the second time position.

According to a seventh aspect of the embodiments of this disclosure, there is provided a terminal equipment, including the apparatus as described in the fourth or the fifth aspect.

According to an eighth aspect of the embodiments of this disclosure, there is provided a network device, including the apparatus as described in the sixth aspect.

According to a ninth aspect of the embodiments of this disclosure, there is provided a communication system, including the terminal equipment as described in the seventh aspect and the network device as described in the eighth aspect.

According to another aspect of the embodiments of this disclosure, there is provided a computer readable program, which, when executed in a terminal equipment, will cause a computer to carry out the method described in the first or second aspect in the terminal equipment.

According to a further aspect of the embodiments of this disclosure, there is provided a storage medium storing a computer readable program, which will cause a computer to carry out the method described in the first or second aspect in a terminal equipment.

According to yet another aspect of the embodiments of this disclosure, there is provided a computer readable program, which, when executed in a network device, will cause a computer to carry out the method described in the third aspect in the network device.

According to still another aspect of the embodiments of this disclosure, there is provided a storage medium storing a computer readable program, which will cause a computer to carry out the method described in the third aspect in a network device.

An advantage of the embodiments of this disclosure exists in that with the method of the embodiment of this disclosure, the terminal equipment terminates the channel detection after determining that the channel is idle, and transmits data after a time length (a first time length). As the first time length is less than or equal to a time length of an OFF-ON transient period to which the data correspond (the second time length), a time length between terminating the channel detection and transmitting the data may be reduced, thereby improving utilization of resources.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
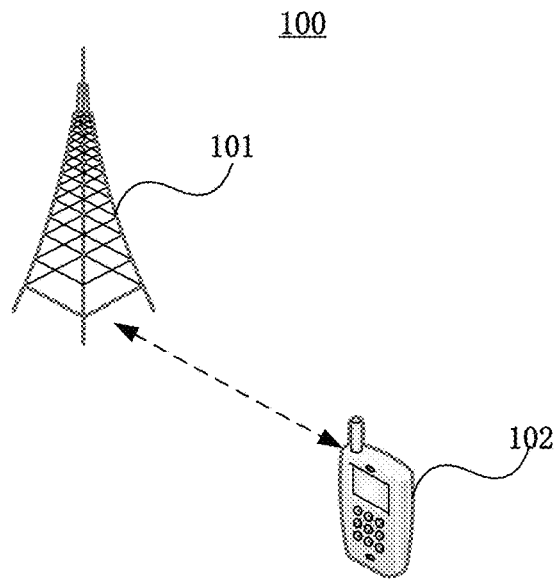
FIG. 1 is schematic diagram of a communication system of an embodiment.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of or" a type of in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, equipment accessing to a communication network and receiving network services via a network device, and may also be referred to as "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, a communication system 100 may include a network device 101 and a terminal equipment 102. For the sake of simplicity, description is given in FIG. 1 by taking one terminal equipment as an example. And the network device 101 may be, for example, a network device gNB in NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

The terminal equipment 102 may transmit data to the network device 101 in, for example, a grant-free transmission manner. The network device 101 may receive data transmitted by one or more terminal equipments 102, and feedback information (such as acknowledgement ACK/non-acknowledgement NACK) to the terminal equipment 102, and the terminal equipment 102 may acknowledge termination of the transmission process according to the feedback information, or may further perform new data transmission, or may perform data retransmission.

In order to make the embodiments of this disclosure more clear and easy to be understood, types of channel access (process or method or mechanism) shall be briefly described below.

There are three types of channel access. One is immediate transmission, which is called as type 1. In type 1, a device may directly transmit data without performing channel detection; another one is channel detection corresponding to a fixed time length (such as CCA, and LBT), which is called as type 2. In the following description, CCA and LBT refer to the same meaning, that is, a channel detection process before transmitting data, unless otherwise specified, such as LBT without random back-off, which can also be called as Cat 2 LBT. In type 2, the device performs channel detection for a fixed time length before transmitting data, and transmits data if the channel is idle within the fixed time length. For example, the fixed time length is defer period+N CCA slot (N≥1); for another example, the fixed time length is M CCA slot (M≥1). The defer period is, for example, 16 us, a CCA slot is a clear channel assessment slot, and a CCA slot is, for example, 9 us. What described above are examples only, and this disclosure is not limited thereto. A further type is channel access corresponding to channel detection of unfixed time length (such as CCA, and LBT), which is called as type 3, such as LBT with random back-off, which can also be called as Cat 4 LBT. In type 3, the device performs channel detection before transmitting data, a time length needed by the channel detection needs to be determined by using a random number, and data are transmitted if the channel is idle within the time length.

Various implementations of the embodiments of this disclosure will be described below with reference to the accompanying drawings. These implementations are exemplary only, and are not intended to limit this disclosure.

Embodiment 1

Figure 2:
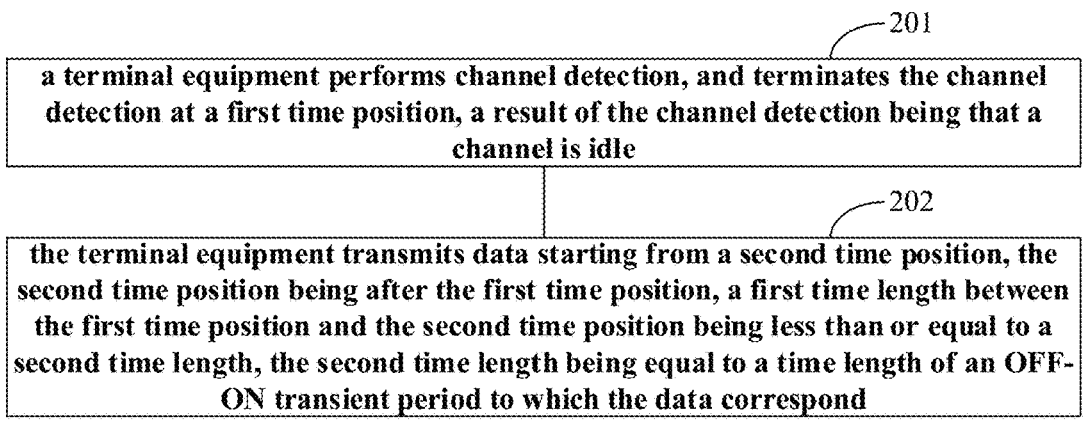
FIG. 2 is a schematic diagram of the data transmission method of Embodiment 1.

The embodiment of this disclosure provides a data transmission method, applicable to a terminal equipment, such as the above-described UE. FIG. 2 is a schematic diagram of the data transmission method of this embodiment. As shown in FIG. 2, the method includes:

step 201: a terminal equipment performs channel detection, and terminates the channel detection at a first time position, a result of the channel detection being that a channel is idle; and step 202: the terminal equipment transmits data starting from a second time position, the second time position being after the first time position, a first time length between the first time position and the second time position being less than or equal to a second time length, the second time length being equal to a time length of an OFF-ON transient period to which the data correspond.

In this embodiment, the terminal equipment terminates the channel detection after determining that the channel is idle, and transmits data after a time length (the first time length). As the first time length is less than or equal to the time length (the second time length) of the OFF-ON transient period corresponding to the data, a time length between terminating the channel detection and transmitting the data may be reduced, thereby improving utilization of resources.

In this embodiment, the above first time position may be an ending position of a last clear channel assessment (CCA) slot to which the channel detection corresponds, or may be before the ending position of a last clear channel assessment (CCA) slot to which the channel detection corresponds, which is not limited in this embodiment.

In this embodiment, the above second time position is the starting position of the above data. The above data is, for example, a UL burst, which is defined as at least one transmission from a given terminal equipment, if two or more transmissions are contained, there is no gap between adjacent transmissions or a gap therebetween does not exceed 16 us. The at least one transmission includes one or more of a PUSCH, a PUCCH, a PRACH, and an SRS. Adjacent transmissions of a terminal equipment with a gap exceeding 16 us are deemed as respectively belonging to different UL bursts.

In this embodiment, the above first time length may be greater than 0, or may be equal to zero, and the above second time length may be greater than 0.

In one implementation, the above second time length may be the time length of the OFF-ON transient period corresponding to the data. Second time lengths corresponding to data including different signals and/or channels may be different.

In this implementation, the above first time position may be after the starting position of the OFF-ON transient period corresponding to the data. Therefore, the OFF-ON transient period corresponding to the data overlaps in the time domain with the last CCA slot of the channel detection.

In this implementation, the above second time position may be before the ending position of the OFF-ON transient period corresponding to the data. Therefore, the OFF-ON transient period corresponding to the data overlaps the above data in the time domain.

In this implementation, the first time position may be after the starting position of the OFF-ON transient period corresponding to the data, and the second time position may be before the ending position of the OFF-ON transient period corresponding to the data. Therefore, the OFF-ON transient period overlaps with the last CCA slot of the channel detection and the above data in the time domain.

In this implementation, as the OFF-ON transient period corresponding to the data overlaps with the last clear channel assessment slot (CCA slot) of the channel detection and/or the data in the time domain, a time length between terminating the channel detection and transmitting the data may be reduced, thereby improving utilization of resources.

The method of this embodiment shall be described below by taking that the channel access type is type 2 as an example.

Assuming that a detection duration of the channel detection is T_sensing_interval, if the terminal equipment detects that the channel is idle within at least T_sensing_interval (e.g. 25 us) and starts to transmit data after T_interval_2 (T_interval_2>=0 us), T_sensing_interval and/or T_interval_2 is/are related to the OFF-ON transient period corresponding to the data, in other words, T_sensing_interval and/or T_interval_2 overlap(s) with the OFF-ON transient period. The starting position of the OFF-ON transient period is before the ending position of the last CCA slot (or called Observation slot, such as 9 us) in the channel detection of the duration T_sensing_interval.

Figure 3:
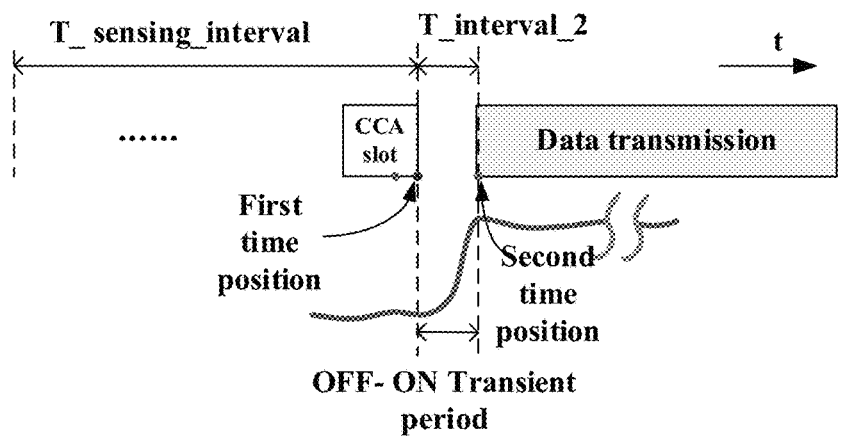
FIGS. 3 through 6 are schematic diagrams of time domain relationships among an OFF-ON transient period, a first time position and a second time position.
Figure 4:
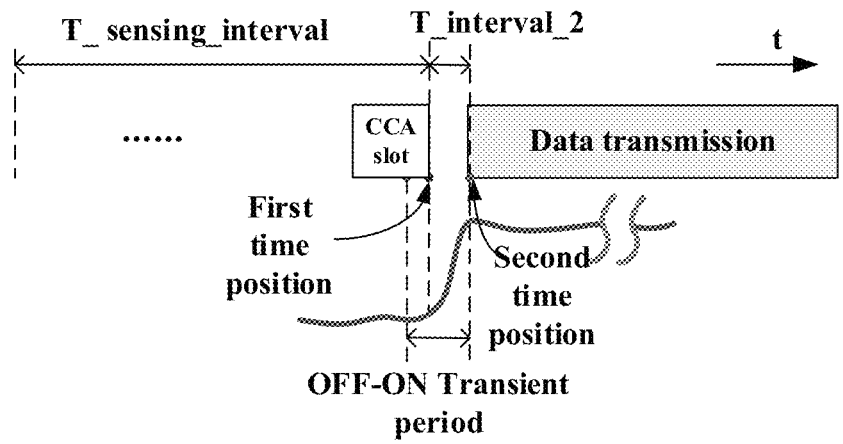
Figure 5:
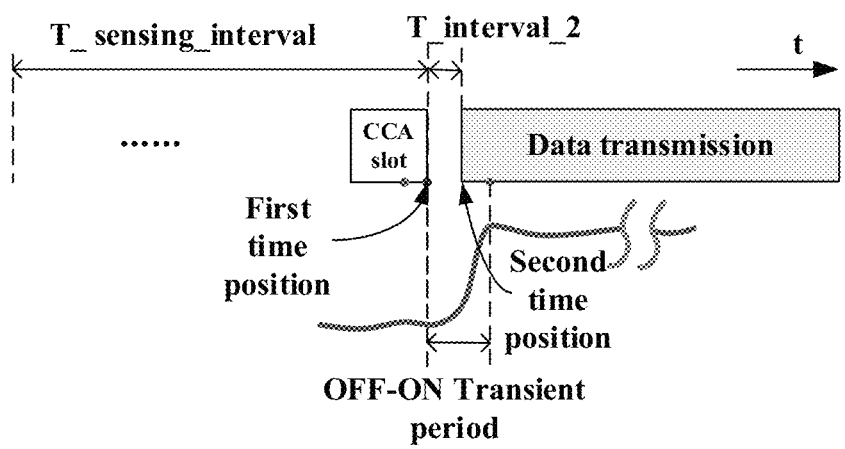
Figure 6:
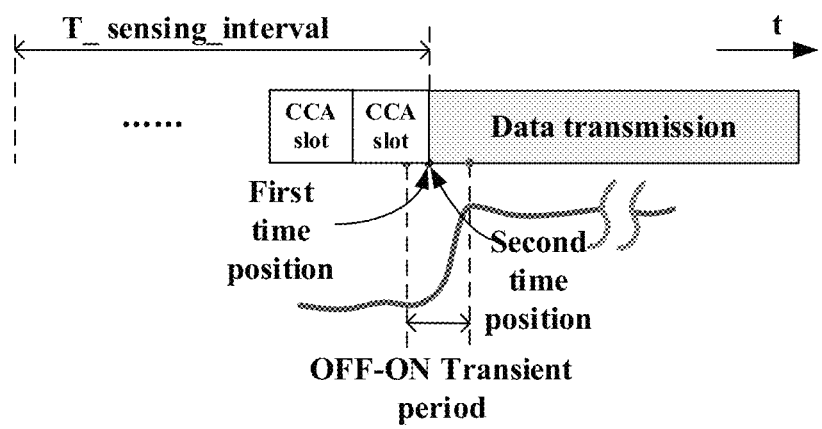

FIGS. 3-6 show time domain relationships among the OFF-ON transient period, the first time position (the ending position of the channel detection, a rear edge of the last CCA slot) and the second time position (the starting position of the data transmission). In FIG. 3, the OFF-ON transient period does not overlap with the first time position and the second time position in the time domain; in FIG. 4, the OFF-ON transient period overlaps with the first time position in the time domain; In FIG. 5, the OFF-ON transient period overlaps with the second time position in the time domain; and in FIG. 6, the OFF-ON transient period overlaps with the first time position and the second time position respectively in the time domain.

With the method of the embodiment of this disclosure, the terminal equipment terminates the channel detection after determining that the channel is idle, and transmits data after a time length (the first time length). As the first time length is less than or equal to a time length of the OFF-ON transient period to which the data correspond (the second time length), a time length between terminating the channel detection and transmitting the data is reduced, thereby improving utilization of resources.

Embodiment 2

Figure 7:
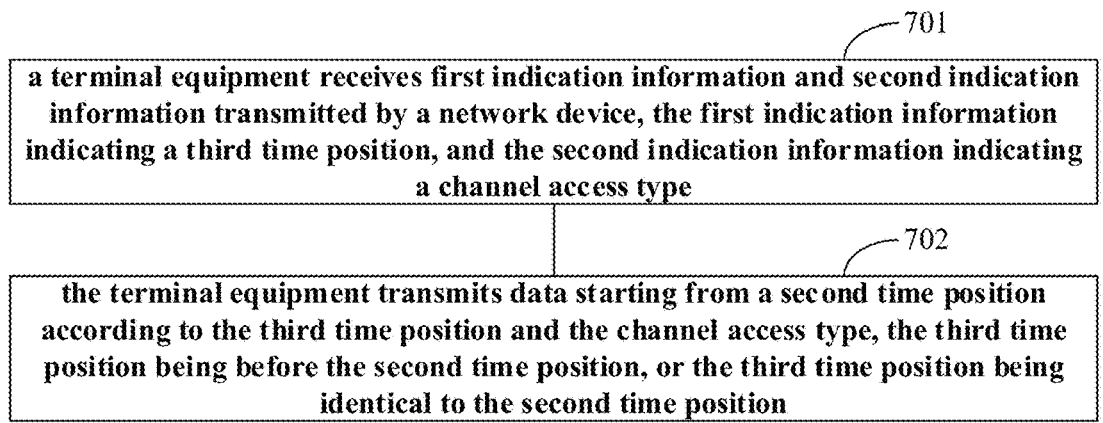
FIG. 7 is a schematic diagram of the data transmission method of Embodiment 2.

The embodiment of this disclosure provides a data transmission method, applicable to a terminal equipment, such as the above-described UE. FIG. 7 is a schematic diagram of the data transmission method of this embodiment. As shown in FIG. 7, the method includes:

step 701: a terminal equipment receives first indication information and second indication information transmitted by a network device, the first indication information indicating a third time position, and the second indication information indicating a channel access type; and step 702: the terminal equipment transmits data starting from a second time position according to the third time position and the channel access type, the third time position being before the second time position, or the third time position being identical to the second time position.

In LTE-LAA, a network equipment may indicate terminal equipments of starting positions (such as PUSCH starting positions) and/or ending positions (such as PUSCH ending symbols) for transmitting data, so as to ensure that the terminal equipments have sufficient time to detect channels and access to the channels before transmitting data. After a terminal equipment receives the starting position indicated by the network device, it starts to detect the channel before the starting position. When the terminal equipment completes channel detection just before the starting position and the channel is idle, it may immediately start to transmit data (including cyclic prefix (CP)) from the starting position. A starting position of an OFF-ON transient period corresponding to the data transmitted by the terminal equipment in LTE-LAA is identical to the starting position of the data, and the position where the terminal equipment starts to occupy the channel is the starting position indicated by the base station.

However, if a starting position of an OFF-ON transient period corresponding to data transmitted by a device of an NR-based unlicensed band operation (NR-U) is before a starting position of the data (all terminal equipments or a part of terminal equipments), it means that the device of the NR-U will occupy a channel before transmitting the data. Considering that NR-U may coexist with other technologies (such as LTE-LAA), that is, competing and sharing channels of the same frequency band, starting positions of occupying channels by devices of different technologies should be identical as possible. In this way, two or more devices may simultaneously detect that the channel is idle and may transmit data successfully, thereby resources of unlicensed band or sharing band may be shared more fairly and efficiently.

In this embodiment, the network device indicates a time position (a third time position) related to the starting position (the second time position) of the data transmission to the terminal equipment via the first indication information, and indicates the channel access type to the terminal equipment via the second indication information. Hence, the terminal equipment may transmit data at the starting position (the second time position) of the data transmission according to the time position (the third time position) and the channel access type indicated by the network device. Therefore, the starting position of the channel occupied by the terminal equipment may be adapted to the relevant characteristics of the data (such as UL burst), so as to achieve more fair and effective sharing resources of the unlicensed/sharing bands while meeting requirements on reliability of data transmission and the timeliness of system control as possible.

In this embodiment, timing for transmitting or receiving the first indication information and the second indication information is not limited, that is, the first indication information and the second indication information may be received at the same time, or they may not be received at the same time, that is, the network device may transmit the first indication information and the second indication information at the same time, or may not transmit the first indication information and the second indication information at the same time. Furthermore, indication manners of the first indication information and the second indication information are not limited in this embodiment. For example, the indications may be made via any one or more of the following signaling: RRC signaling, an MAC CE, and physical layer signaling, the physical signaling being, for example, DCI, or signaling carried by a physical layer signal. For another example, the indications may be made in the same signaling, or may be made in different signaling.

In this embodiment, the above second time position is the starting position of the above data, and the above data are, for example, UL bursts. A definition of a UL burst is as described above, and description thereof is omitted here. In this embodiment, the third time position is before the second time position, or the third time position is identical to the second time position.

In one implementation, the terminal equipment may determine the second time position according to the third time position.

Figure 8:
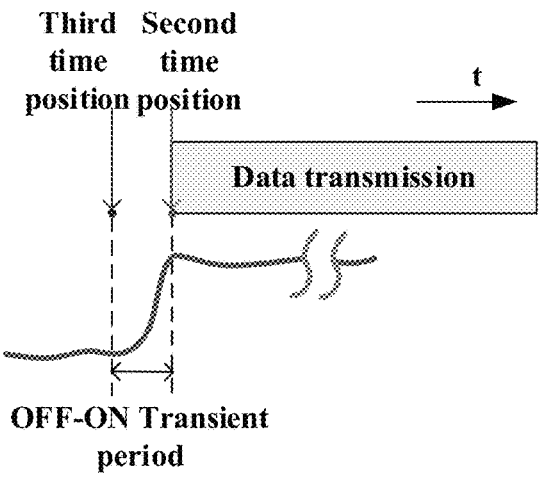
FIGS. 8 through 11 are schematic diagrams of time domain relationships among an OFF-ON transient period, a third time position and a second time position.

FIG. 8 is a schematic diagram of an example of a time domain relationship among the third time position, the second time position and the OFF-ON transient period. As shown in FIG. 8, in this example, the third time position is before the second time position.

In the example of FIG. 8, the third time position may be related to the starting position of the channel occupied by the terminal equipment, or, in other words, may be related to the starting position of the OFF-ON transient period corresponding to the above data. For example, the above third time position may be the starting position of the OFF-ON transient period corresponding to the above data, or the third time position may be between the starting position and the ending position of the OFF-ON transient period corresponding to the above data. Therefore, the terminal equipment may determine the second time position according to the third time position indicated by the network device, and then transmit the above data at the second time position.

Figure 9:
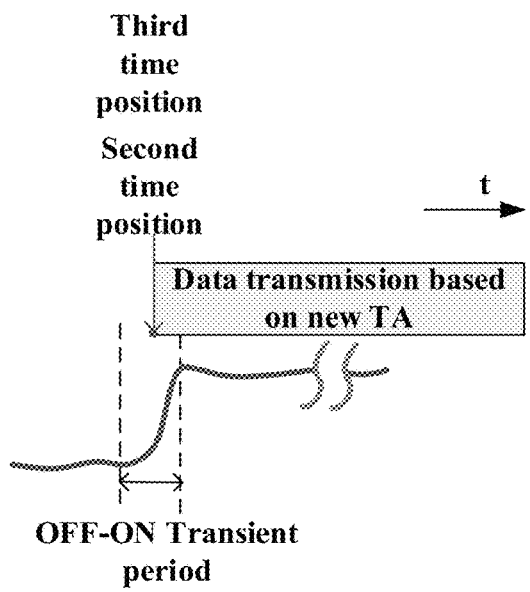

FIG. 9 is a schematic diagram of an example of a time domain relationship among the third time position, the second time position and the OFF-ON transient period. As shown in FIG. 9, in this example, the third time position and the second time position are identical.

In the example of FIG. 9, the second time position (i.e. the third time position) is before the ending position of the OFF-ON transient period corresponding to the data, and the terminal equipment may transmit a sequence at a first symbol of the data, such as an SRS, or, the terminal equipment may repeatedly transmit information on the first symbol at subsequent symbols. Therefore, as the second time position overlaps with the OFF-ON transient period in the time domain, a time length between terminating the channel detection and transmitting the data is reduced, thereby improving utilization of resources. And as a part of a PUSCH or a PUCCH or a PRACH is not transmitted separately at the first symbol, reliability of the PUSCH or the PUCCH or the PRACH may be ensured as possible.

In another implementation, the terminal equipment may determine the second time position according to the third time position and the relative position between the third time position and the second time position.

In this implementation, the above relative position may be indicated by the network device, or may be predefined. For example, the terminal equipment may receive third indication information transmitted by the network device, the third indication information indicating the above relative position.

In this implementation, timing for transmitting or receiving the third indication information and the first indication information and/or the second indication information is not limited in this disclosure, that is, the third indication information and the first indication information and/or the second indication information may be received simultaneously or nonsimultaneously, that is, the network device may transmit the third indication information and the first indication information and/or the second indication information simultaneously, or may transmit the third indication information and the first indication information and/or the above second indication information nonsimultaneously. In addition, manners of indicating the third indication information and the first indication information and/or the second indication information are not limited in this embodiment. For example, they may be indicated via any one or more of the following signaling: RRC signaling, an MAC CE, and physical layer signaling, the physical signaling being, for example, DCI, or signaling carried by a physical layer signal. For another example, they may be indicated in the same signaling or in different signaling.

In this implementation, the above relative position (a first relative position, the relative position between the third time position and the second time position) may be related to a relative position (a second relative position) between the starting position of the OFF-ON transient period and a starting position (the second time position) of a corresponding UL burst. For example, the first relative position is the second relative position. In particular, assuming that the third time position is the starting position of the OFF-ON transient period, if the starting position of the OFF-ON transient period is identical to the second time position, the third time position is identical to the second time position; and if the starting position of the OFF-ON transient period is before the second time position, the third time position is before the second time position.

In addition, in this implementation, the above second relative position may satisfy at least one of the following conditions. For example, in this implementation, relative positions to which data of different time domain resource lengths correspond may be different. That is, data corresponding to different time domain resource lengths may adopt different relative positions (the above second relative positions). For example, for a UL burst with a time domain resource length greater than a threshold, the starting position of the OFF-ON transient period is identical to the starting position (the second time position) of the corresponding UL burst; otherwise, the starting position of the OFF-ON transient period is before the starting position (the second time position) of the corresponding UL burst; wherein the ending position of the OFF-ON transient period may be identical to the starting position of the corresponding UL burst.

For another example, in this implementation, relative positions to which data of different subcarrier spacings (SCSs) correspond may be different. That is, UL bursts of different SCSs may adopt different relative positions.

For a further example, in this implementation, relative positions to which data including different signals or channels correspond may be different. That is, data including different channels or signals (such as PUCCHs or PRACHs or SRSs or PUSCHs) may adopt different relative positions. For example, for a PUSCH or an SRS, the starting position of the OFF-ON transient period is identical to a starting position of a corresponding UL burst; and for a PRACH or a PUCCH, the starting position of the OFF-ON transient period is before a starting position of a corresponding UL burst; wherein the ending position of the OFF-ON transient period may be identical to the starting position of the corresponding UL burst. Hence, for a frequency division multiplexed channel or signal, a device transmitting the PRACH or PUCCH may access the channel preferentially, thereby reducing latency of random access and control information and ensuring normal operations of the system.

For still another example, in this implementation, relative positions to which data carrying different information correspond may be different. That is, data carrying different information may adopt different relative positions. For example, for data only including UCI (such as an SR, ACK/NACK, CSI) or random access related information (RA related information, such as msg.1, and msg.3), the starting position of the OFF-ON transient period is identical to a starting position of corresponding data; otherwise, the ending position of the OFF-ON transient period is identical to the starting position of the corresponding data. Therefore, for a frequency division multiplexed UL burst, a device transmitting control-relate information may access the channel preferentially, thereby reducing latency of the control-relate information and ensuring normal operations of the system.

Figure 10:
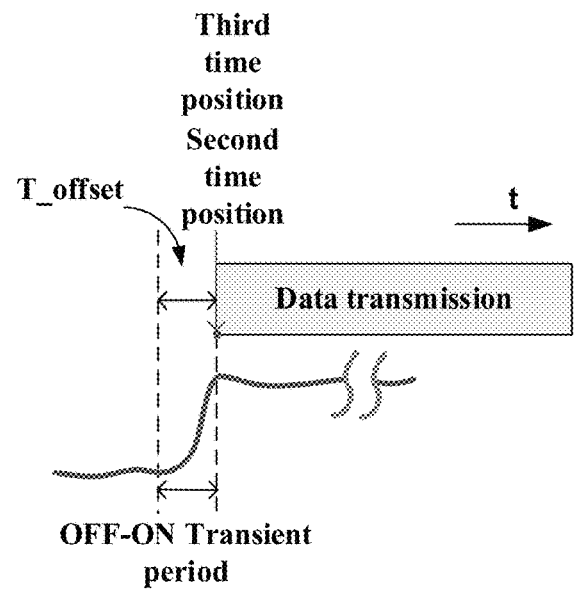

FIG. 10 is a schematic diagram of an example of a time domain relationship among the third time position, the second time position and the OFF-ON transient period. As shown in FIG. 10, in this example, the third time position is identical to the second time position.

In the example of FIG. 10, the above third indication information includes the first relative position, such as offset information (T_offset). The offset information may be related to the starting position of the channel occupied by the terminal equipment, or the offset information may be related to the OFF-ON transient period corresponding to the above data, or, a time position corresponding to the offset information may overlap with the OFF-ON transient period corresponding to the above data, for example, the time position corresponding to the offset information is identical to the OFF-ON transient period corresponding to the data. Thus, the terminal equipment may determine the starting position of the OFF-ON transient period.

Figure 11:
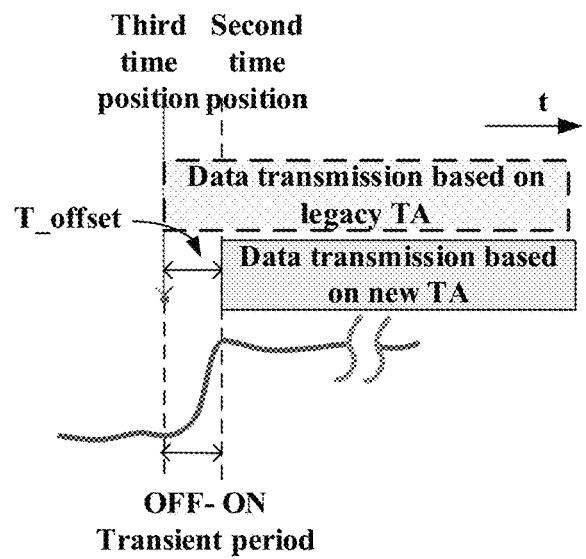

FIG. 11 is a schematic diagram of an example of a time domain relationship among the third time position, the second time position and the OFF-ON transient period. As shown in FIG. 11, in this example, the third time position is before the second time position.

In the example of FIG. 11, the third time position is a starting position of data transmission determined based on legacy time advance (TA), such as $(N_{TA}+N_{TA}\text{ offset})\times T_c$, and the terminal equipment needs further to determine a starting position of real data transmission (i.e. the above second time position) according to an offset value (such as T_offset), that is, calculate new time advance according to T_offset. The offset value is taken as the first relative position, and may be indicated by the network device, or may be predefined.

In this embodiment, the network device indicates the third time position via the first indication information, and the terminal equipment may determine the second time position according to the third time position. Thus, starting positions of the channels occupied by the NR-U device and devices of different technologies (such as LTE-LAA) may be made identical as possible, thereby resources of unlicensed band or sharing band may be shared more fairly and efficiently. Furthermore, the terminal equipment may determine the second time position according to the third time position and the relative position between the third time position and the second time position. Therefore, the starting position of the channel occupied by the terminal equipment may be adapted to the relevant characteristics of the UL burst, so as to achieve more fair and effective sharing resources of the unlicensed/sharing bands while meeting requirements on reliability of data transmission and the timeliness of system control as possible.

In this embodiment, the terminal equipment may also perform channel detection corresponding to data or not perform channel detection before transmitting the data according to the channel access type included in the second indication information, and whether to perform channel detection is mainly dependent on the channel access type. A particular channel detection method is not limited in this embodiment.

In this embodiment, the terminal equipment may also determine the channel access type to which the above data correspond, and the determined channel access type may be different from the channel access type indicated by the second indication information.

In one implementation, when the second indication information indicates that the channel access type to which the above data correspond is Type 1, the terminal equipment may determine the channel access type to which the above data correspond according to a condition (referred to as a first condition), or, in other words, determine whether to use Type 1 or use Type 2 or 3.

In this implementation, the first condition is related to whether reference data of the above data (referred to as first reference data) are transmitted. For example, if the first reference data of the above data are actually transmitted, Type1 is adopted, and if the first reference data of the above data are not transmitted, Type1 is not adopted.

In this implementation, whether the above first reference data are transmitted may be detected by the terminal equipment, or may be indicated by the network device, which is not limited in this embodiment. And a time interval between an ending position of the first reference data and the starting position of the data is less than or equal to 16 us.

In this embodiment, the first reference data may be predefined, or may be preconfigured, or may be indicated by the network device, and a particular indication manner is not limited in this embodiment.

With the method of this embodiment, resources of unlicensed band or sharing band may be shared more fairly and efficiently.

Embodiment 3

Figure 13:
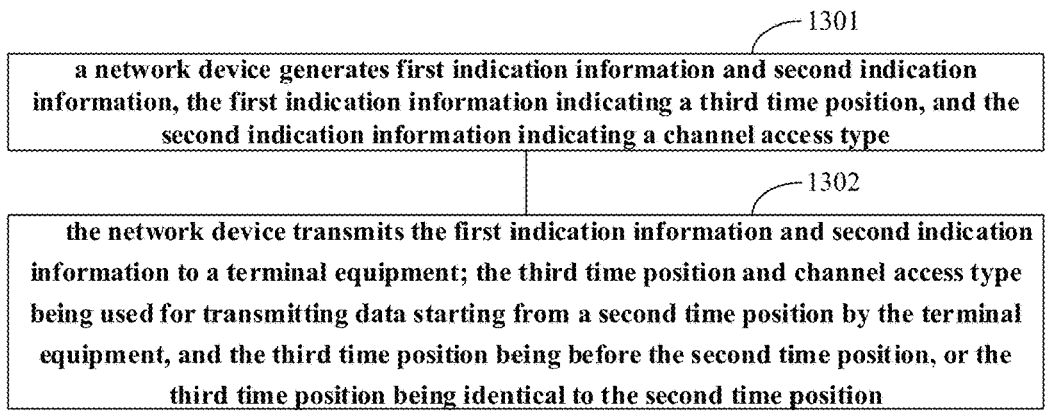
FIG. 13 is a schematic diagram of the data transmission method of Embodiment 3.

The embodiment of this disclosure provides a data transmission method, applicable to a network device. This method is processing at a network side corresponding to the method in Embodiment 1 or 2, with contents identical to those in embodiments 1 and 2 being not going to be described herein any further FIG. 13 is a schematic diagram of the data transmission method of this embodiment. As shown in FIG. 13, the method includes:

step 1301: a network device generates first indication information and second indication information, the first indication information indicating a third time position, and the second indication information indicating a channel access type; and step 1302: the network device transmits the first indication information and second indication information to a terminal equipment;

the third time position and channel access type being used for transmitting data starting from a second time position by the terminal equipment, and the third time position being before the second time position, or the third time position being identical to the second time position.

In this embodiment, the network device indicates a time position (the third time position) related to the starting position (the second time position) of data transmission to the terminal equipment via the first indication information, and indicates the channel access type to the terminal equipment via the second indication information, whereby the terminal equipment may transmit data at the starting position (the second time position) of data transmission according to the time position (the third time position) and the channel access type indicated by the network device. Hence, the starting position of the channel occupied by the terminal equipment may be adapted to the relevant characteristics of the data (such as UL bursts), so as to achieve more fair and effective sharing resources of the unlicensed/sharing bands while meeting requirements on reliability of data transmission and the timeliness of system control as possible.

In this embodiment, as described in Embodiment 2, the above first indication information and the above second indication information may be transmitted simultaneously or nonsimultaneously.

In this embodiment, as described in Embodiment 2, the second time position is the starting position of the data, and the second time position may be before the ending position of the OFF-ON transient period corresponding to the data.

In this embodiment, the network device may also generate the third indication information and transmit the third indication information to the terminal equipment, the third indication information indicating the relative position between the third time position and the second time position. By indicating the relative position, the terminal equipment may determine the starting position (the second time position) for data transmission according to the third time position indicated by the first indication information and the relative position indicated by the third indication information.

In this embodiment, as described in Embodiment 2, the above relative position may be related to the starting position of the channel occupied by the terminal equipment.

In this embodiment, as described in Embodiment 2, the above relative position may satisfy at least one of the following conditions that: relative positions to which data of different time-domain resource lengths correspond are different; relative positions to which data of different subcarrier spacings (SCSs) correspond are different; relative positions to which data including different signals or channels correspond are different; and relative positions to which data carrying different information correspond are different.

In this embodiment, the above third indication information and the above first indication information and/or the above second indication information may be transmitted simultaneously or nonsimultaneously.

In this embodiment, as described in Embodiment 2, the above third time position may be related to the starting position of the channel occupied by the terminal equipment, and may also be related to the starting position of the OFF-ON transient period corresponding to the above data; for example, the third time position may be the starting position of the OFF-ON transient period corresponding to the data, or the third time position may be between the starting position and the ending position of the OFF-ON transient period corresponding to the data.

In this embodiment, the channel access type at least includes: directly transmitting data without performing channel detection and transmitting data after performing channel detection of a first fixed time length. The network device may indicate different channel access types when different conditions are satisfied. For example, it may indicate the terminal equipment via the above second indication information to transmit data directly without performing channel detection (type 1) when a second condition is satisfied, and may indicate the terminal equipment via the above second indication information to transmit data after performing channel detection of a first fixed time length (type 2) when a third condition is satisfied. In this embodiment, the above second condition is different from the above third condition.

In this embodiment, the above second condition and the above third condition may be respectively related to at least one of the following.

For example, the second condition and the third condition may be related to the time interval between the above data and reference data (referred to as second reference data), the second reference data preceding the data in the time domain. For example, the above second condition may be that: the time interval between the above data and the second reference data is not greater than a maximum time interval, i.e. 16 us; for channel access of type 1, the maximum time interval may be 16 us. For another example, the above third condition may be that: the time interval between the above data and the second reference data is not greater than the maximum time interval, i.e. 25 us; for channel access of type 2, the maximum time interval may be 25 us. When the time interval between the above data and the second reference data is less than or equal to 16 us, the network device determines that the channel access type is type 1, and when the time interval between the above data and the second reference data is less than or equal to 25 us, the network device determines that the channel access type is type 2. Alternatively, the second condition and the third condition may be that: the time interval between the data and the second reference data is not greater than the maximum time interval and is not less than the minimum time interval. The above time interval and the above second reference data shall be described later.

For another example, the above second condition and the above third condition may be related to a channel (such as a PUCCH or a PRACH or a PUSCH) or a signal (such as an SRS) of the above data. For example, the above second condition may be that: the above data includes a PRACH only and/or a PUCCH only, and when the above data includes the PRACH only and/or the PUCCH only, the network device determines that the channel access type is type 1. For another example, the above third condition may be that: the above data includes a PRACH only and/or a PUCCH only, and when the above data includes the PRACH only and/or the PUCCH only, the network device determines that the channel access type is type 2.

For a further example, the above second condition and the above third condition may be related to the information (such as UCI (such as an SR, ACK/NACK, CSI) or random access related information (such as msg.1, msg.3)) carried by the above data. For example, the above second condition may be that: the information carried by the above data includes ACK/NACK only and/or msg.1 only, and when the information carried by the above data includes the ACK/NACK only and/or msg.1 only, the network device determines that the channel access type is type 1. For another example, the above third condition may be that: the information carried by the above data includes ACK/NACK only and/or msg.1 only, and when the information carried by the above data includes the ACK/NACK only and/or msg.1 only, the network device determines that the channel access type is type 2.

For still another example, the above second condition and the above third condition may be related to a relative position of the above data in a corresponding channel occupancy time (COT). For example, the above second condition may be that: the above data is a first uplink data in the COT, that is, a data before the above data is a first downlink data in the COT, when the above data is the first uplink data in the COT, the network device determines that the channel access type is type 1. For another example, the above third condition may be that: the above data is a first uplink data in the COT, that is, a data before the above data is a first downlink data in the COT, when the above data is the first uplink data in the COT, the network device determines that the channel access type is type 2. For a further example, the above second condition may be that: in a case of supporting the network device to transmit data again in the COT after the terminal equipment transmits data, the number of times of downlink data before the uplink data in the corresponding COT is not greater than N1 (N1>=1), and when the above number of times is less than or equal to N1, the network device determines that the channel access type is type 1. For still another example, the above second condition and the above third condition may be that: in a case of supporting the network device to transmit data again in the COT after the terminal equipment transmits data, the number of times of downlink data before the uplink data in the corresponding COT is not greater than N1 (N1>=1), and when the above number of times is less than or equal to N1, the network device determines that the channel access type is type 2.

For yet another example, the above second condition and the above third condition may be related to a length of a time domain resource corresponding to the above data.

In this embodiment, the starting position of the time interval may be the ending position of the second reference data, or the starting position of the time interval may be the ending position of the ON-OFF transient period corresponding to the second reference data, or, the starting position of the time interval may be between the ending position of the second reference data and the ending position of the ON-OFF transient period corresponding to the second reference data; wherein the ending position of the second reference data is before the ending position of the ON-OFF transient period corresponding to the second reference data.

In this embodiment, the ending position of the time interval may be the second time position (i.e. the starting position of the data), or the ending position of the time interval may be the starting position of the OFF-ON transient period corresponding to the data, or the ending position of the above time interval may be between the starting position of the OFF-ON transient period corresponding to the above data and the above second time position (i.e. the starting position of the data); wherein the starting position of the OFF-ON transient period corresponding to the above data is before the above second time position (i.e. the starting position of the data).

Figure 12:
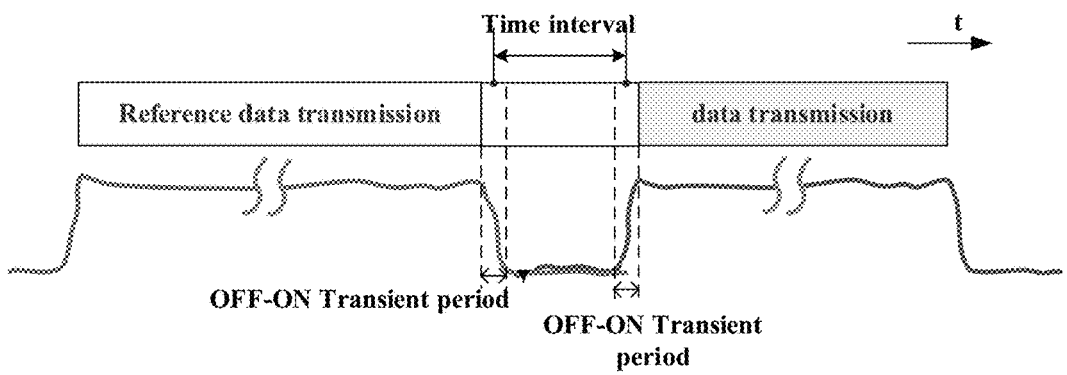
FIG. 12 is a schematic diagram of an example of a time interval.

FIG. 12 is an example of the above time interval.

In this embodiment, starting positions and/or ending positions of time intervals corresponding to different channel access types are different.

In this embodiment, the starting position of the above data (i.e. the second time position) may also be referred to as a starting position of a time domain resource corresponding to the above data, or may be referred to as a starting position of a first symbol of the above data, or may be referred to as a first effective sampling point corresponding to the above data, or may be referred to as a starting position of a baseband signal, etc.

In this embodiment, as some channel access types need channel detection (such as type 2) and some channel access types do not need channel detection (such as type 1), time intervals to which different channel access types correspond may be determined in different manners, that is, starting positions and/or ending positions of the above time interval to which different channel access types correspond may be different. Therefore, the network device may determine the starting position and/or ending position of the corresponding time interval according to different channel access types.

In this embodiment, the network device may also determine the starting position and/or ending position of the time interval according to the channel access type indicated by the second indication information.

In this embodiment, the above second reference data may be any one of the following or more thereof: a first downlink data in the COT where the data are present; a latest downlink data before the data in the COT where the data are present; downlink data including the second indication information; and a latest data before the data in the COT where the data are present.

For example, the second reference data is both the first downlink data in the COT where the data are present and the latest downlink data before the data in the COT where the data are present. For another example, the second reference data is the latest downlink data before the data in the COT where the data are located, the downlink data being, for example, downlink data including the second indication information.

In this embodiment, as channel detection is not needed, in order to avoid collision with other devices as much as possible, that is, reducing a possibility that other devices access to the same channel and transmit data by using the same resources before transmitting UL bursts, the above second reference data may be data actually transmitted in the COT where the above data are present.

With the method of this embodiment, resources of unlicensed band or sharing band may be shared more fairly and efficiently.

Embodiment 4

The embodiment of this disclosure provides a data transmission apparatus, configured in a terminal equipment. As principles of the apparatus for solving problems are similar to that of the method in Embodiment 1, reference may be made to the implementation of the method in Embodiment 1 for implementation of this apparatus, with identical contents being not going to be described herein any further.

Figure 14:
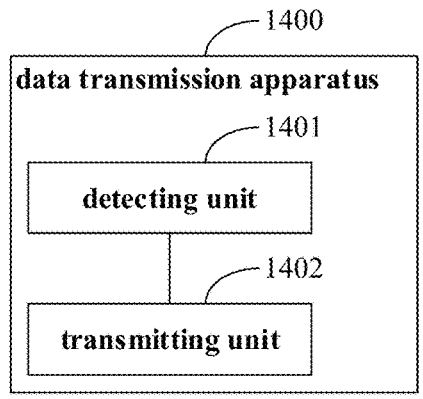
FIG. 14 is a schematic diagram of the data transmission apparatus of Embodiment 4.

FIG. 14 is a schematic diagram of the data transmission apparatus of this embodiment. Referring to FIG. 14, a data transmission apparatus 1400 includes a detecting unit 1401 and a transmitting unit 1402. The detecting unit 1401 is configured to perform channel detection, and terminate the channel detection at a first time position, a result of the channel detection being that a channel is idle; and the transmitting unit 1402 is configured to transmit data starting from a second time position, the second time position being after the first time position, a first time length between the first time position and the second time position being less than or equal to a second time length, the second time length being equal to a time length of an OFF-ON transient period to which the data correspond.

In this embodiment, the first time position may be after a starting position of the OFF-ON transient period to which the data correspond, and/or the second time position may be before an ending position of the OFF-ON transient period to which the data correspond.

In this embodiment, in time domain, the OFF-ON transient period may be overlapped with a last clear channel assessment slot of the channel detection, and/or in time domain, the OFF-ON transient period may be overlapped with the data.

In this embodiment, the first time length may be greater than or equal to 0, and the second time length may be greater than 0.

In this embodiment, the second time position is the starting position of the above data.

In this embodiment, the first time position may an ending position of the last clear channel assessment slot to which the channel detection corresponds, or the first time position may be before an ending position of the last clear channel assessment slot to which the channel detection corresponds.

With the apparatus of this embodiment, a time length between terminating the channel detection and transmitting the data is reduced, thereby improving utilization of resources.

Embodiment 5

The embodiment of this disclosure provides a data transmission apparatus, configured in a terminal equipment. As principles of the apparatus for solving problems are similar to that of the method in Embodiment 2, reference may be made to the implementation of the method in Embodiment 2 for implementation of this apparatus, with identical contents being not going to be described herein any further.

Figure 15:
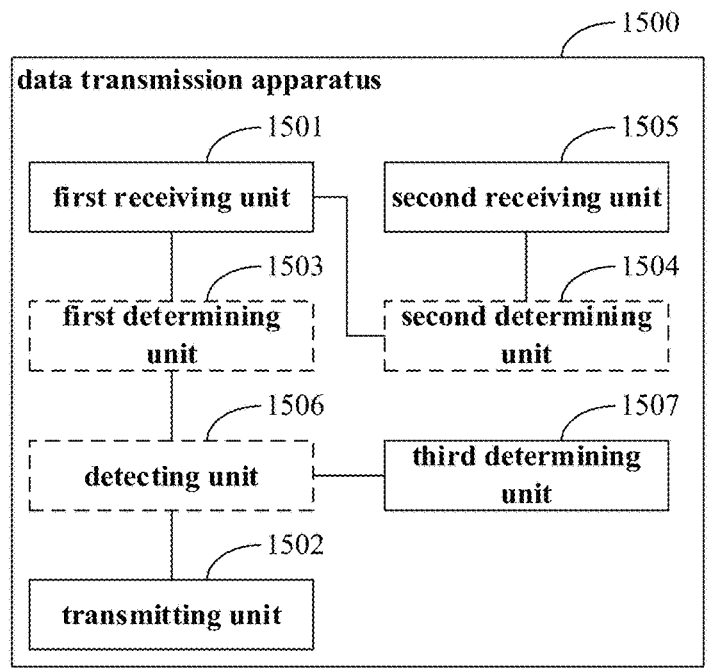
FIG. 15 is a schematic diagram of the data transmission apparatus of Embodiment 5.

FIG. 15 is a schematic diagram of the data transmission apparatus of this embodiment. Referring to FIG. 15, a data transmission apparatus 1500 includes a first receiving unit 1501 and a transmitting unit 1502. The first receiving unit 1501 is configured to receive first indication information and second indication information transmitted by a network device, the first indication information indicating a third time position, and the second indication information indicating a channel access type, and the transmitting unit 1502 is configured to transmit data starting from a second time position according to the third time position and the channel access type, the third time position being before the second time position, or the third time position being identical to the second time position.

In this embodiment, the above first indication information and the above second indication information may be received simultaneously or nonsimultaneously.

In this embodiment, the above second time position is a starting position of the above data.

In this embodiment, the above second time position may be before an ending position of the OFF-ON transient period corresponding to the above data.

In this embodiment, the above third time position may be related to a starting position of the channel occupied by the terminal equipment.

In this embodiment, the third time position may be related to the OFF-ON transient period corresponding to the data; for example, the third time position may be a starting position of the OFF-ON transient period corresponding to the data; or, the third time position may be between the starting position and the ending position of the OFF-ON transient period corresponding to the above data.

In one implementation of this embodiment, as shown in FIG. 15, the apparatus 1500 may further include a first determining unit 1503 configured to determine the second time position according to the third time position.

In one implementation of this embodiment, as shown in FIG. 15, the apparatus 1500 may further include a second determining unit 1504 configured to determine the second time position according to the third time position and a relative position between the third time position and the second time position. The relative position may be indicated by the network device, or may be predefined.

For example, as shown in FIG. 15, the apparatus 1500 may further include a second receiving unit 1505 configured to receive third indication information transmitted by the network device, the third indication information indicating the relative position.

In this implementation, the above third indication information and the above first indication information and/or the above second indication information may be received simultaneously or nonsimultaneously.

In this implementation, the relative position may be related to a starting position of the channel occupied by the terminal equipment.

In this implementation, the relative position may satisfy at least one of the following conditions that: relative positions to which data of different time-domain resource lengths correspond are different; relative positions to which data of different subcarrier spacings (SCSs) correspond are different; relative positions to which data including different signals or channels correspond are different; and relative positions to which data carrying different information correspond are different.

In this embodiment, as shown in FIG. 15, the apparatus 1500 may further include:

a detecting unit 1506 configured to perform channel detection corresponding to the data or not to perform channel detection before transmitting the data according to the channel access type.

In this embodiment, as shown in FIG. 15, the apparatus 1500 may further include: a third determining unit 1507 configured to determine a channel access type to which the data correspond, the determined channel access type to which the data correspond may be different from the channel access type indicated by the second indication information.

In this embodiment, the third determining unit 1507 may determine the channel access type to which the data correspond according to a first condition, the first condition may be related to whether first reference data of the data are transmitted.

With the apparatus of this embodiment, resources of unlicensed band or sharing band may be shared more fairly and efficiently.

Embodiment 6

The embodiment of this disclosure provides a data transmission apparatus, configured in a network device. As principles of the apparatus for solving problems are similar to that of the method in Embodiment 3, reference may be made to the implementation of the method in Embodiment 3 for implementation of this apparatus, with identical contents being not going to be described herein any further.

Figure 16:
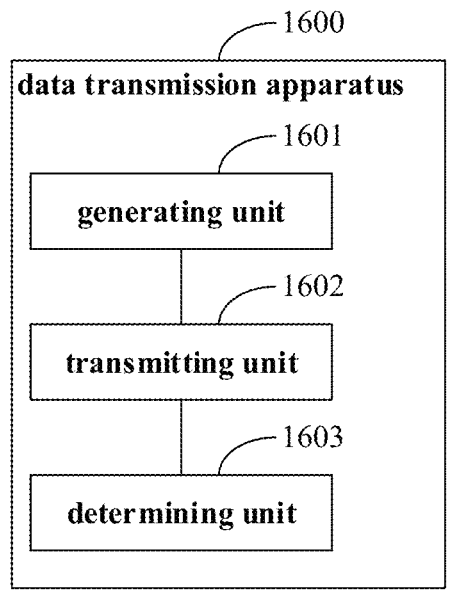
FIG. 16 is a schematic diagram of the data transmission apparatus of Embodiment 6.

FIG. 16 is a schematic diagram of the data transmission apparatus of this embodiment. Referring to FIG. 16, a data transmission apparatus 1600 includes a generating unit 1601 and a transmitting unit 1602. The generating unit 1601 is configured to generate first indication information and second indication information; and the transmitting unit 1602 is configured to transmit the first indication information and second indication information to a terminal equipment. In this embodiment, the first indication information indicates a third time position, and the second indication information indicates a channel access type, the third time position and channel access type being used for transmitting data starting from a second time position by the terminal equipment, and the third time position being before the second time position, or the third time position being identical to the second time position.

In this embodiment, the above first indication information and the above second indication information may be transmitted simultaneously or nonsimultaneously.

In this embodiment, the above second time position is a starting position of the above data.

In this embodiment, the above second time position may be before an ending position of the OFF-ON transient period corresponding to the above data.

In this embodiment, the generating unit 1601 may further generate third indication information, the third indication information including a relative position between the third time position and the second time position; and the transmitting unit 1602 may further transmit the third indication information to the terminal equipment.

In this embodiment, the relative position may be related to a starting position of the channel occupied by the terminal equipment.

In this embodiment, the relative position may satisfy at least one of the following conditions that: relative positions to which data of different time-domain resource lengths correspond are different; relative positions to which data of different subcarrier spacings (SCSs) correspond are different; relative positions to which data including different signals or channels correspond are different; and relative positions to which data carrying different information correspond are different.

In this embodiment, the above third indication information and the above first indication information and/or the above second indication information may be transmitted simultaneously or nonsimultaneously.

In this embodiment, the third time position may be related to a starting position of the channel occupied by the terminal equipment.

In this embodiment, the third time position may be related to the OFF-ON transient period corresponding to the data; for example, the third time position may be a starting position of the OFF-ON transient period corresponding to the data; or, the third time position may be between the starting position and the ending position of the OFF-ON transient period corresponding to the above data.

In this embodiment, the channel access type at least includes: directly transmitting data without performing channel detection, and transmitting data after performing channel detection of a first fixed time length. When a second condition is satisfied, the network device may indicate the terminal equipment to directly transmit data without performing channel detection via the second indication information; and when a third condition is satisfied, the network device may indicate the terminal equipment to transmit data after performing channel detection of the first fixed time length via the second indication information; wherein the second condition is different from the third condition.

In this embodiment, the second condition and the third condition may be respectively related to at least one of the following: a time interval between the data and the second reference data, in time domain, the second reference data being before the data; channels or signals of the data; information carried by the data; relative positions of the data in a corresponding channel occupation time (COT); and time-domain resource lengths to which the data correspond.

In this embodiment, the starting position of the time interval may be the ending position of the second reference data, or the starting position of the time interval may be the ending position of the ON-OFF transient period corresponding to the second reference data, or, the starting position of the time interval may be between the ending position of the second reference data and the ending position of the ON-OFF transient period corresponding to the second reference data; wherein the ending position of the second reference data is before the ending position of the ON-OFF transient period corresponding to the second reference data.

In this embodiment, the ending position of the above time interval may be the above second time position, or the ending position of the above time interval may be the starting position of the OFF-ON transient period corresponding to the above data, or the ending position of the time interval may be between the starting position of the OFF-ON transient period corresponding to the data and the second time position; wherein the starting position of the OFF-ON transient period corresponding to the data is before the second time position.

In this embodiment, starting positions and/or ending positions of time intervals to which different channel access types correspond are different.

In this embodiment, as shown in FIG. 16, the apparatus 1600 may further include:

a determining unit 1603 configured to determine the starting position and/or ending position of the time interval according to the channel access type indicated by the second indication information.

In this embodiment, the second reference data may be one of the following or more thereof: a first downlink data in the COT where the data are present; a latest downlink data before the data in the COT where the data are present; downlink data including the second indication information; and a latest data before the data in the COT where the data are present.

In this embodiment, the second reference data may be data actually transmitted in the COT where the above data are present.

With the apparatus of this embodiment, resources of unlicensed band or sharing band may be shared more fairly and efficiently.

Embodiment 7

The embodiment of this disclosure provides a terminal equipment, including the apparatus described in Embodiment 4 or 5.

Figure 17:
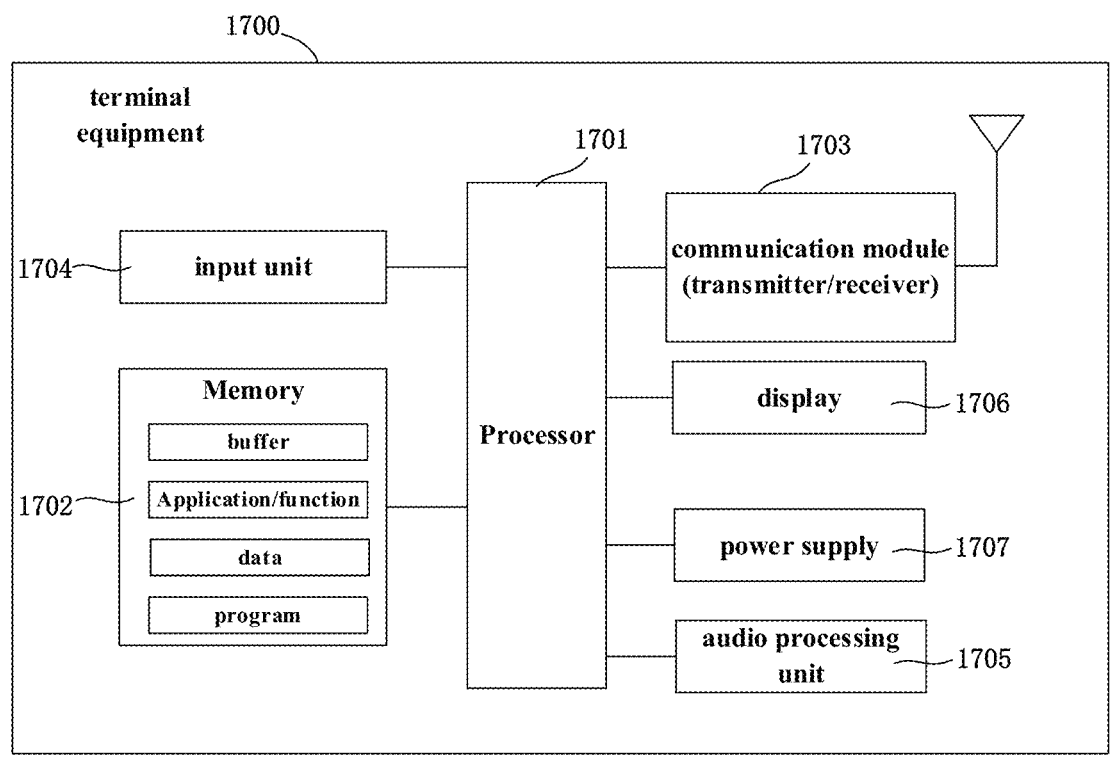
FIG. 17 is a schematic diagram of the terminal equipment of Embodiment 7.

FIG. 17 is a schematic diagram of the terminal equipment of the embodiment of this disclosure. As shown in FIG. 17, a terminal equipment 1700 may include a central processor 1701 and a memory 1702, the memory 1702 being coupled to the central processor 1701. It should be noted that this figure is illustrative only, and other types of structures may also be used, so as to supplement or replace this structure and achieve a telecommunications function or other functions.

In one implementation, the functions of the apparatus described in Embodiment 4 or 5 may be integrated into the central processor 1701, and the central processor 1701 executes functions of the apparatus described in Embodiment 4 or 5. The functions of the apparatus described in Embodiment 4 or 5 are incorporated herein, and shall not be described herein any further.

In another implementation, the apparatus described in Embodiment 4 or 5 and the central processor 1701 may be configured separately; for example, the apparatus described in Embodiment 4 or 5 may be configured as a chip connected to the central processor 1701, and the functions of the apparatus described in Embodiment 4 or 5 are executed under control of the central processor 1701.

As shown in FIG. 17, the terminal equipment 1700 may further include a communication module 1703, an input unit 1704, an audio processing unit 1705, a display 1706, and a power supply 1707, etc. It should be noted that the terminal equipment 1700 does not necessarily include all the parts shown in FIG. 17. Furthermore, the terminal equipment 1700 may include parts not shown in FIG. 17, and the related art may be referred to.

As shown in FIG. 17, the central processor 1701 is sometimes referred to as a controller or an operational control, which may include a microprocessor or other processor devices and/or logic devices. The central processor 1701 receives input and controls operations of components of the terminal equipment 1700.

The memory 1702 may be, for example, one or more of a buffer memory, a flash memory, a hard drive, a mobile medium, a volatile memory, a nonvolatile memory, or other suitable devices, which may store various data, etc., and furthermore, store programs executing related information. And the central processor 1701 may execute programs stored in the memory 1702, so as to realize information storage or processing, etc. Functions of other parts are similar to those of the related art, which shall not be described herein any further. The parts of the terminal equipment 1700 may be realized by specific hardware, firmware, software, or any combination thereof, without departing from the scope of this disclosure.

With the terminal equipment of this embodiment, on the one hand, a time length between terminating the channel detection and transmitting the data is reduced, thereby improving utilization of resources. And on the other hand, resources of unlicensed band or sharing band may be shared more fairly and efficiently.

Embodiment 8

The embodiment of this disclosure provides a network device, such as a gNB (a base station in NR), including the apparatus described in Embodiment 6.

Figure 18:
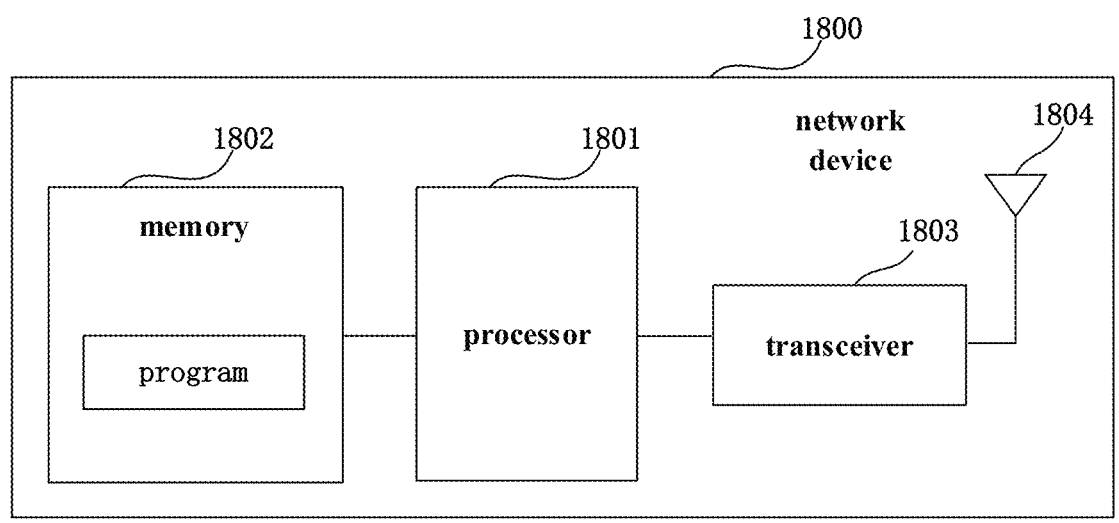
FIG. 18 is a schematic diagram of the network device of Embodiment 8.

FIG. 18 is a schematic diagram of the network device of the embodiment of this disclosure. As shown in FIG. 18, a network device 1800 may include a central processor (CPU) 1801 and a memory 1802, the memory 1802 being coupled to the central processing unit 1801. The memory 1802 may store various data, and furthermore, it may store a program for data processing, and execute the program under control of the central processor 1801, so as to receive various information transmitted by a terminal equipment, and transmit various information to the terminal equipment.

In one implementation, the functions of the apparatus described in Embodiment 6 may be integrated into the central processor 1801, and the central processor 1801 executes functions of the apparatus described in Embodiment 6. The functions of the apparatus described in Embodiment 6 are incorporated herein, and shall not be described herein any further.

In another implementation, the apparatus described in Embodiment 6 and the central processor 1801 may be configured separately; for example, the apparatus described in Embodiment 6 may be configured as a chip connected to the central processor 1801, and the functions of the apparatus described in Embodiment 6 are executed under control of the central processor 1801.

Furthermore, as shown in FIG. 18, the network device 1800 may include a transceiver 1803, and an antenna 1804, etc. Functions of the above components are similar to those in the related art, and shall not be described herein any further. It should be noted that the network device 1800 does not necessarily include all the parts shown in FIG. 18. Furthermore, the network device 1800 may include parts not shown in FIG. 18, and the related art may be referred to.

With the network device of this embodiment, resources of unlicensed band or sharing band may be shared more fairly and efficiently.

Embodiment 9

The embodiment of this disclosure provides a communication system, including a network device and a terminal equipment. The network device is, for example, the network device 1800 described in Embodiment 8, and the terminal equipment is, for example, the terminal equipment 1700 described in Embodiment 7.

In this embodiment, the terminal equipment is, for example, a UE served by a gNB, and may include the functions of the apparatus described in Embodiment 4 or 5 and carry out the method described in Embodiment 1 or 2. And furthermore, it may include conventional compositions and functions of a terminal equipment, which are as described in Embodiment 7, and shall not be described herein any further.

In this embodiment, the network device may be, for example, a gNB in NR, and may include the functions of the apparatus described in Embodiment 6 and carry out the method described in Embodiment 3. And furthermore, it may include conventional compositions and functions of a network device, which are as described in Embodiment 8, and shall not be described herein any further.

With the communication system of this embodiment, on the one hand, a time length between terminating the channel detection and transmitting the data may be reduced, thereby improving utilization of resources. And on the other hand, resources of unlicensed band or sharing band may be shared more fairly and efficiently.

An embodiment of this disclosure provides a computer readable program, which, when executed in a terminal equipment, will cause a computer to carry out the method described in Embodiment 1 or 2 in the terminal equipment.

An embodiment of this disclosure provides a storage medium storing a computer readable program, which will cause a computer to carry out the method described in Embodiment 1 or 2 in a terminal equipment.

An embodiment of this disclosure provides a computer readable program, which, when executed in a network device, will cause a computer to carry out the method described in Embodiment 3 in the network device.

An embodiment of this disclosure provides a storage medium storing a computer readable program, which will cause a computer to carry out the method described in Embodiment 3 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1A. data transmission apparatus, configured in a terminal equipment, the apparatus including:
a detecting unit configured to perform channel detection, and terminate the channel detection at a first time position, a result of the channel detection being that a channel is idle; and
a transmitting unit configured to transmit data starting from a second time position, the second time position being after the first time position, a first time length between the first time position and the second time position being less than or equal to a second time length, the second time length being equal to a time length of an OFF-ON transient period to which the data correspond.

2A. The apparatus according to supplement 1A, wherein the first time position is after a starting position of the OFF-ON transient period to which the data correspond, and/or the second time position is before an ending position of the OFF-ON transient period to which the data correspond.

3A. The apparatus according to supplement 2A, wherein in a time domain, the OFF-ON transient period is overlapped with a last clear channel assessment slot of the channel detection, and/or in the time domain, the OFF-ON transient period is overlapped with the data.

4A. The apparatus according to any one of supplements 1A-3A, wherein the first time length is greater than or equal to 0, and the second time length is greater than 0.

5A. The apparatus according to any one of supplements 1A-4A, wherein the second time position is a starting position of the data.

6A. The apparatus according to any one of supplements 1A-5A, wherein the first time position is an ending position of the last clear channel assessment slot to which the channel detection corresponds, or the first time position is before an ending position of the last clear channel assessment slot to which the channel detection corresponds.

1B. A data transmission apparatus, configured in a terminal equipment, the apparatus including:
a first receiving unit configured to receive first indication information and second indication information transmitted by a network device, the first indication information indicating a third time position, and the second indication information indicating a channel access type; and
a transmitting unit configured to transmit data starting from a second time position according to the third time position and the channel access type,
the third time position being before the second time position, or the third time position being identical to the second time position.

2B. The apparatus according to supplement 1B, wherein the apparatus further includes:
a first determining unit configured to determine the second time position according to the third time position.

3B. The apparatus according to supplement 1B or 2B, wherein the apparatus further includes:
a detecting unit configured to perform channel detection corresponding to the data or not to perform channel detection before transmitting the data according to the channel access type.

4B. The apparatus according to any one of supplements 1B-3B, wherein the first indication information and the second indication information are transmitted simultaneously or nonsimultaneously.

5B. The apparatus according to any one of supplements 1B-4B, wherein the apparatus further includes:
a second determining unit configured to determine the second time position according to the third time position and a relative position between the third time position and the second time position.

6B. The apparatus according to supplement 5B, wherein the apparatus further includes:
a second receiving unit configured to receive third indication information transmitted by the network device, the third indication information indicating the relative position.

7B. The apparatus according to supplement 6B, wherein the third indication information and the first indication information and/or the second indication information are transmitted simultaneously or nonsimultaneously.

8B. The apparatus according to any one of supplements 5B-7B, wherein the relative position satisfies at least one of the following conditions that:
relative positions to which data of different time-domain resource lengths correspond are different;
relative positions to which data of different subcarrier spacings (SCSs) correspond are different;
relative positions to which data including different signals or channels correspond are different; and
relative positions to which data carrying different information correspond are different.

9B. The apparatus according to any one of supplements 5B-8B, wherein the relative position is related to a starting position of a channel occupied by the terminal equipment.

10B. The apparatus according to any one of supplements 1B-9B, wherein the third time position is related to the starting position of the channel occupied by the terminal equipment.

11B. The apparatus according to any one of supplements 1B-10B, wherein the third time position is a starting position of an OFF-ON transient period to which the data correspond, or the third time position is between a starting position and an ending position of an OFF-ON transient period to which the data correspond.

12B. The apparatus according to any one of supplements 1B-11B, wherein the second time position is a starting position of the data.

13B. The apparatus according to any one of supplements 1B-12B, wherein the second time position is before the ending position of the OFF-ON transient period to which the data correspond.

14B. The apparatus according to any one of supplements 1B-13B, wherein the apparatus further includes:
a third determining unit configured to determine a channel access type to which the data correspond, the channel access type determined by the third determining unit being different from the channel access type indicated by the second indication information.

15B. The apparatus according to supplement 14B, wherein the third determining unit determines the channel access type to which the data correspond according to a first condition, the first condition being related to whether first reference data of the data are transmitted.

1C. A data transmission apparatus, configured in a network device, the apparatus including:
a generating unit configured to generate first indication information and second indication information; and a transmitting unit configured to transmit the first indication information and second indication information to a terminal equipment;

wherein the first indication information indicates a third time position, and the second indication information indicates a channel access type, the third time position and channel access type being used for transmitting data starting from a second time position by the terminal equipment, and the third time position being before the second time position, or the third time position being identical to the second time position.

2C. The apparatus according to supplement 1C, wherein the first indication information and the second indication information are transmitted simultaneously or nonsimultaneously.

3C. The apparatus according to supplement 1C or 2C, wherein the second time position is a starting position of the data.

4C. The apparatus according to any one of supplements 1C-3C, wherein the second time position is before the ending position of the OFF-ON transient period to which the data correspond.

5C. The apparatus according to any one of supplements 1C-4C, wherein, the generating unit further generates third indication information, the third indication information indicating a relative position between the third time position and the second time position;

and the transmitting unit further transmits the third indication information to the terminal equipment.

6C. The apparatus according to supplement 5C, wherein the relative position is related to a starting position of a channel occupied by the terminal equipment.

7C. The apparatus according to supplement 5C or 6C, wherein the relative position satisfies at least one of the following conditions that:

relative positions to which data of different time-domain resource lengths correspond are different;

relative positions to which data of different subcarrier spacings (SCSs) correspond are different;

relative positions to which data including different signals or channels correspond are different; and relative positions to which data carrying different information correspond are different.

8C. The apparatus according to any one of supplements 5C-7C, wherein the third indication information and the first indication information and/or the second indication information are transmitted simultaneously or nonsimultaneously.

9C. The apparatus according to one of supplements 1C-8C, wherein the third time position is related to the starting position of the channel occupied by the terminal equipment.

10C. The apparatus according to one of supplements 1C-9C, wherein the third time position is a starting position of an OFF-ON transient period to which the data correspond, or the third time position is between a starting position and an ending position of an OFF-ON transient period to which the data correspond.

11C. The apparatus according to one of supplements 1C-10C, wherein the channel access type at least includes: directly transmitting data without performing channel detection; and transmitting data after performing channel detection of a first fixed time length;

the network device indicates the terminal equipment via the second indication information to transmit data directly without performing channel detection when a second condition is satisfied, and indicates the terminal equipment via the second indication information to transmit data after performing channel detection of a first fixed time length when a third condition is satisfied;

wherein the second condition is different from the third condition.

12C. The apparatus according to supplement 11C, wherein the second condition and the third condition are respectively related to at least one of the following:

a time interval between the data and the second reference data, in time domain, the second reference data being before the data;

channels or signals of the data;

information carried by the data;

relative positions of the data in a corresponding channel occupation time (COT); and time-domain resource lengths to which the data correspond.

13C. The apparatus according to supplement 12C, wherein the starting position of the time interval is the ending position of the second reference data, or the starting position of the time interval is the ending position of the ON-OFF transient period corresponding to the second reference data, or, the starting position of the time interval is between the ending position of the second reference data and the ending position of the ON-OFF transient period corresponding to the second reference data;

wherein the ending position of the second reference data is before the ending position of the ON-OFF transient period corresponding to the second reference data.

14C. The apparatus according to supplement 12C or 13C, wherein the ending position of the time interval is the second time position, or the ending position of the time interval is the starting position of the OFF-ON transient period to which the data correspond, or the ending position of the time interval is between the starting position of the OFF-ON transient period to which the data correspond and the second time position;

and wherein the starting position of the OFF-ON transient period to which the data correspond is before the second time position.

15C. The apparatus according to any one of supplements 12C-14C, wherein starting positions and/or ending positions of the time interval to which different channel access types correspond are different.

16C. The apparatus according to any one of supplements 12C-15C, wherein the second reference data are one of the following:

a first downlink data in the COT where the data are present;

a latest downlink data before the data in the COT where the data are present;

downlink data including the second indication information; and a latest data before the data in the COT where the data are present.

17C. The apparatus according to supplement 16C, wherein the second reference data are data actually transmitted in the COT where the data are present.

What is claimed is:

1. A data transmission apparatus, configured in a terminal equipment, the apparatus comprising:
 a receiver configured to receive first indication information transmitted by a network device, the first indication information indicating beginning of a transmission;
 processor circuitry configured to perform channel detection before the transmission; and
 a transmitter configured to transmit the transmission when result of the channel detection is idle, wherein an OFF-ON transient period for the transmission starts before the beginning of the transmission and extends into the transmission.

2. The apparatus according to claim 1, wherein in a time domain, the OFF-ON transient period is overlapped with a last sensing slot of the channel detection and the transmission.

3. The apparatus according to claim 1, wherein the transmission includes cyclic prefix.

4. The apparatus according to claim 1, wherein the receiver is further configured to receive second indication information transmitted by the network device, the second indication information indicating a channel access type for the transmission.

5. The apparatus according to claim 4, wherein the processor circuitry is further configured to perform channel detection corresponding to the transmission or not to perform channel detection before transmitting the transmission according to the channel access type.

6. The apparatus according to claim 4, wherein the processor circuitry is further configured to determine a channel access type to which the transmission corresponds, the channel access type determined by the processor circuitry being different from the channel access type indicated by the second indication information.

7. The apparatus according to claim 6, wherein the processor circuitry is further configured to determine the channel access type to which the transmission corresponds according to a first condition, the first condition being related to whether a first reference transmission of the transmission is transmitted.

8. The apparatus according to claim 1, wherein the beginning of the transmission is within the OFF-ON transient period to which the transmission corresponds.

9. A data transmission apparatus, configured in a network device, the apparatus comprising:
 a transmitter configured to transmit first indication information to a terminal equipment;
 wherein the first indication information indicates beginning of a transmission transmitted by the terminal equipment, wherein the transmission is transmitted when result of channel detection which is performed before the transmission is idle, and an OFF-ON transient period for the transmission starts before the beginning of the transmission and extends into the transmission.

10. The apparatus according to claim 9, wherein the transmitter is further configured to transmit second indication information to the terminal equipment; and the second indication information indicates a channel access type for the transmission.

11. The apparatus according to claim 10, wherein the channel access type at least comprises: directly transmitting without performing channel detection, and transmitting after performing channel detection of a first fixed time length;
 when a second condition is satisfied, the network device indicates the terminal equipment via the second indication information to transmit the transmission directly without performing channel detection;
 and when a third condition is satisfied, the network device indicates the terminal equipment via the second indication information to transmit the transmission after performing channel detection of the first fixed time length;
 wherein the second condition is different from the third condition.

12. The apparatus according to claim 11, wherein the second condition and the third condition are respectively related to at least one of the following:
 a time interval between the transmission and a second reference transmission, in time domain, the second reference transmission being before the transmission;
 time-domain resource lengths to which the transmission corresponds.

13. The apparatus according to claim 12, wherein an ending position of the time interval is beginning of the transmission.

14. The apparatus according to claim 12, wherein the second reference transmission is a latest transmission before the transmission in the COT where the transmission is present.

* * * * *